Nov. 22, 1966  P. H. ACLOQUE ET AL  3,286,581
METHOD AND APPARATUS FOR DETERMINING SURFACE BIREFRINGENCES
IN A TRANSPARENT MATERIAL EMPLOYING A PRISM
PLACE ADJACENT TO THE SURFACE
Filed Aug. 29, 1960
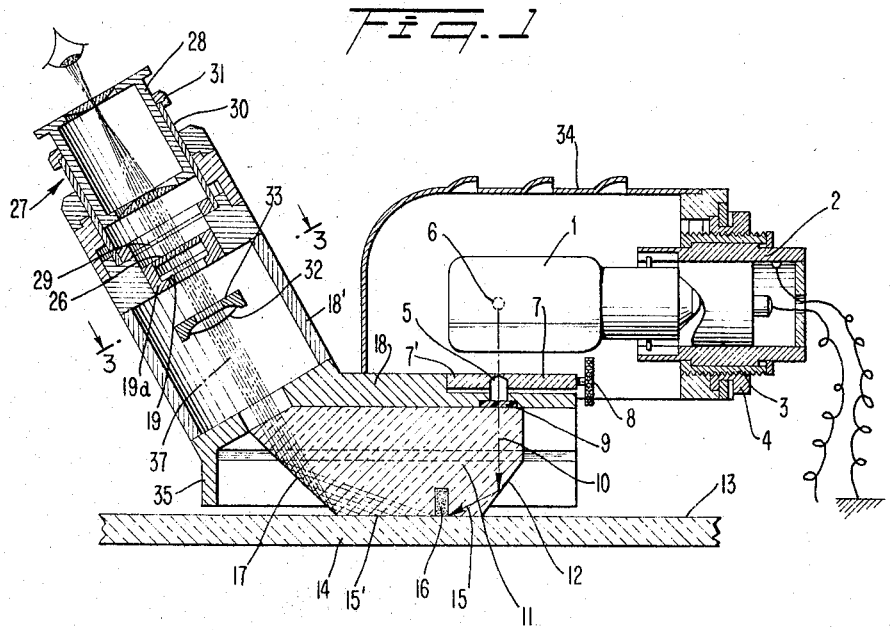
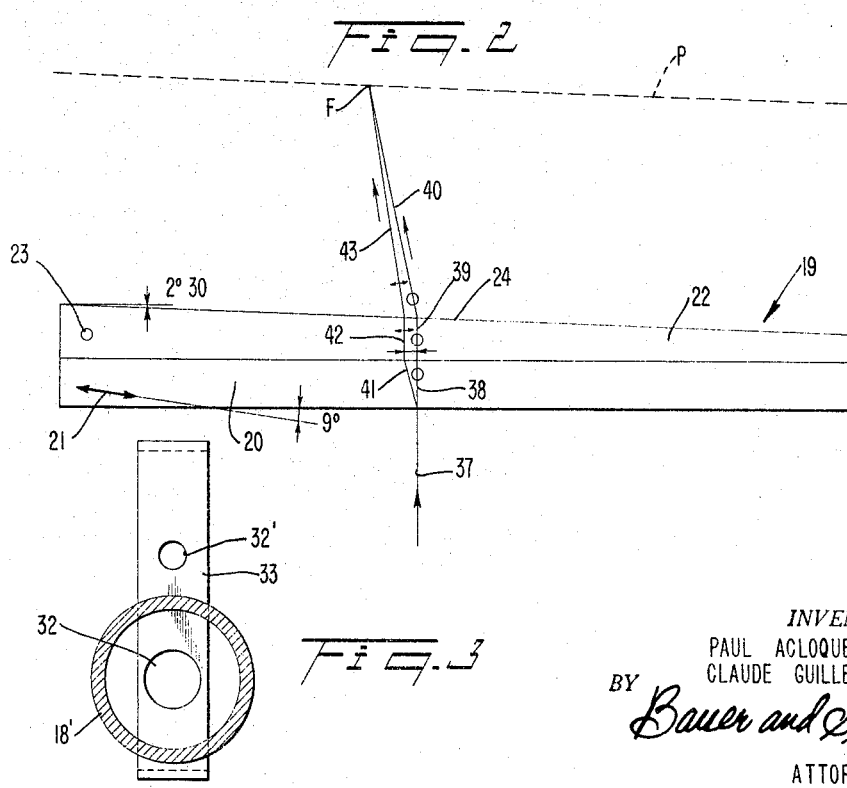
INVENTORS
PAUL ACLOQUE
CLAUDE GUILLEMET
BY
Bauer and Seymour
ATTORNEYS United States Patent Office 3,286,581
Patented Nov. 22, 1966

3,286,581
METHOD AND APPARATUS FOR DETERMINING SURFACE BIREFRINGENCES IN A TRANSPARENT MATERIAL EMPLOYING A PRISM PLACE ADJACENT TO THE SURFACE
Paul Henri Acloque, Paris, and Claude Guillemet, Bessancourt, France, assignors to Compagnie de Saint-Gobain, Neuilly-sur-Seine, France
Filed Aug. 29, 1960, Ser. No. 52,575
Claims priority, application France, Sept. 1, 1959, 803,995
16 Claims. (Cl. 88—14)

This invention relates to optical apparatus, and more particularly to optical apparatus for observing and/or measuring birefringences in a transparent material whereby the strains in such material may be determined.

The invention has among its objects the provision of a novel apparatus for observing birefringences in the surface layers of transparent material whereby the surface strains in such material may be determined.

A further object of the invention resides in the provision of apparatus as set forth above which is provided with means for measuring an eventual rotation of the fringes system according to a method which is by itself an object of the invention.

Yet another object of the invention lies in the provision of improved optical apparatus including novel means for insuring the penetration of the beam of incident light into the transparent material under an angle near 90° with the normal to the surface of the material in such a way that at least a part of the light passes through a very thin superficial layer of the material and to give a precise definition of this angle, novel means to stop parasitic light which has not penetrated the material along this path, and a novel means whereby a predetermined point on the surface of the object may be selected by direct observation and the strains at such point subsequently determined.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in vertical axial section through a preferred embodiment of optical apparatus made in accordance with the invention;

FIG. 2 is a somewhat schematic view of the compensator employed in such apparatus, the plates making up such compensator being shown in side elevation; and FIG. 3 is a view in cross section through the light-receiving barrel portion of the apparatus, the section being taken along the line 3—3 of FIG. 1.

Apparatuses are available for observing and measuring optical properties such as birefringences of transparent material. In such known apparatuses the article such as a plate or sheet of transparent material is subjected to an incident beam of light, which may be polarized, the light passing through the total thickness of the material being examined. The path of the beam of light which is incident upon the material being examined may be either normal or oblique to the faces of the plate of such material. In view of the determination of the birefringence of the medium such apparatus utilize polarized light. It is known that the difference of indexes in the directions of the principal strains of a strained material is proportional to the difference of said principal strains.

As a result, the measurement of the birefringence leads to the knowledge of the strains since such measurement gives the integral of the phase differences due to the birefringence along the paths, oblique or normal, to the plate to be examined, passing throughout said plate.

In the case where the path of the light is normal to the plate under examination it is only possible to know, by said process, the difference between the principal strains. On the other hand, in the case where the path of light is oblique it is possible, by making two successive measures in mutually normal planes, to determine the strains in separate value, which is a considerable advantage.

It will be seen that in some cases it will be impossible to determine the strains within the material in such manner, particularly where the integral of the phase differences is zero in spite of the presence of strains in the material which may be quite large, for example, in cases where the strains are parallel to the faces of the material, variable from one face of the material to the other, and being in equilibrium as in a sheet or plate of glass which has been uniformly tempered.

In the method according to the present invention, the path followed by the light does not pass throughout the medium to study but is confined in a superficial very thin layer. It is then possible to examine the properties in the superficial layers.

In particular it is possible, in using polarized light, to determine the phase differences due to the birefringence, especially when said birefringence results from the existence of strains in the superficial layers.

Said method obviates the above mentioned difficulty, that is to say that, if the integral of the phase differences is zero along the path traversing from part to part the medium, it is still possible to measure the strains in the superficial layers because the light is confined in said superficial layers.

Moreover, in making observations of the two crossed or mutually normal; incidence planes it is possible to obtain the separate values of the principal strains rather than the difference of such strains.

In accordance with the present invention, there is provided a novel apparatus which permits the examination of superficial layers of the material and, in particular when using polarized light, the measure of the birefringences, that is, the phase differences; as a consequence, the superficial strains in the material may also be observed and measured.

The apparatus according to the invention provides means for imposing a beam of incident light in a localized path along the surface of the material being examined, only in a thin superficial layer of the material, by introducing the beam of light in the surface with an angle of incidence such that the light, for example, makes an angle in the neighborhood of 90° with the normal to the surface of the plate at the point of incidence. The apparatus includes means for observing the beam of light which emerges from the said surface of the material being examined. When it is desired to measure the superficial strains in the material, the apparatus includes means for polarizing the incident beam of light.

Let us assume the use of polarized light in order to explain, with greater prevision, the present method and the corresponding apparatus.

Under the conditions above outlined, at least a part of the light beam emerges from the transparent material through the surface which it entered, the points of emergence being located at varying distances from the point of incidence. In its travel through the material the light beam passes through only a superficial layer of the material, the thickness of which is very small. In typical cases it has been observed that the light beam passes through a layer of the material which is less than 1/100 mm. thick.

In order to obtain the desired angle of refraction of the light beam and an accurate definition of said angle, there may be employed an optical piece which makes firm contact with the face of the transparent material. Such optical piece has an index of refraction which is greater than that of the transparent material being observed; whereas there may be employed an interposed layer of liquid between the optical piece and the transparent material being observed, such liquid having an index of refraction at least equal to that of the transparent material.

There is produced a beam of light directly reflected by the surfaces which it encounters in its travel or which is diffused by the media in which it travels. Such reflected or diffused beam tends to hinder the observation of the rather weak light beam emergent from the surface, and so it is desirable to prevent the entry of such parasitic light into the measuring system of the apparatus. For this purpose there is employed a screen which is so placed as to intercept the parasite beam. Thus the light which enters the measuring system is only that portion of the incident beam which has traversed the superficial layer of the transparent material being studied.

In order to determine with accuracy the entering of the light in the medium it is preferable to give to the incident light beam the form of a pencil whose section, at its penetration in the medium is a rectangular section, the length of the rectangular section being very great with respect to its width.

The apparatus includes means for measuring the phase difference along the path followed by the light traveling through the superficial layer of the material which is rendered birefringent by the strains therein. For this purpose there is used a polarized beam of light and in particular a light rectilinearly polarized. In birefringent material polarized light is propagated by means of two rectangular vibrations directed according to the principal directions of the medium, the difference of phase established progressively between the two vibrations being a function of the birefringence of said medium.

The phase difference between such two rectilinear vibrations of polarized light may be measured by means of a compensator. A compensator is a device which itself is birefringent with a birefringence generally variable in a way that may be determined in terms of geometrical data. Said determined birefringence is opposed to the birefringence caused by the medium being examined in order to compensate such latter birefringence. The Babinet compensator, for example, is composed of two quartz prisms which are adjustable relative to each other. The optical axes of such prisms, which are located in planes parallel to one of the faces of each of the prisms, are disposed at right angles to each other. When such compensator is interposed into the path of a beam of polarized light, the compensator introduces an additional phase difference between the components. Such new phase difference, which may be varied in value and which is of a predetermined sign, may be employed to cancel the pre-existing phase difference between the two components. The relative displacement of the two prisms of the compensator which is necessary to cancel the aforesaid phase difference allows such phase difference to be measured. Such compensator is characterized by a plurality of straight fringes which are parallel to each other and to the intersection of the refringent walls or faces of the prisms. Assume that light rectilinear polarized at 45° to the principal directions or axes of the associated prisms constituting the compensator, passes through the prisms. Under such conditions, when an analyzer is positioned at 90° with respect to the polarizer, the system of fringes appears in a plane, called the plane of localization of the fringes, which is located approximately in the central zone of the compensator. A difference in phase between the two components making up the light beam which has traversed the medium being studied causes a displacement of such fringes pattern in its plane of localization. The phase difference between the two vibrations is fully compensated when the two prisms making up the compensator are so displaced relative to each other that the fringes are restored to their initial position.

The phase difference between the two vibrations of the polarized light is not only proportional to the birefringence of the medium traversed by the light but it is also proportional to the length of the path of travel of the light through the birefringent medium. In order to determine the phase difference along the path followed by the polarized light in the superficial layer of the transparent medium one may, in accordance with the invention, correlate the compensator measurement with the length of the path of the light along the layer in the transparent material.

As was said above, the phase difference may be measured by the displacement of the fringes. With polychromatic light, one can follow such displacement of the fringes in measuring the interval between the initial and final positions of a given fringe; this is more preferably done with the black fringe. With monochromatic light it is difficult to identify a particular fringe, and the measurement of the displacement of such fringe is more difficult.

In accordance with a preferred embodiment of the invention, measurement of the birefringences of the superficial layers of a transparent material may be accomplished in another way than by measuring the total displacement of a fringe and then correlating such displacement with the length of travel of the beam of light in the birefringent material. This preferred method, which is new and constitutes a further object of the invention, overcomes the above-mentioned difficulties encountered when monochromatic light is employed.

Under the conditions hereafter disclosed the system of fringes of a fringe compensator is not only displaced but the fringes are also inclined to their original direction. Such inclination is a function of a value of the birefringence of the transparent material through which the analyzing light passes and is independent of the length of the path of the light in such material. Accordingly, the measurement of such angle of inclination of the fringes permits the direct measurement of the superficial strains in the material being examined.

In order to obtain the inclination of the fringes, the compensator, mounted in such manner that its median plane is perpendicular to the emergent beam or bundle of rays, is disposed so that the direction of the refringent edge, which is the natural direction of the fringes, is parallel to the plane of emergence of the light beam. The plane of emergence is the plane defined by an emergent ray and the normal to the surface of the transparent material at the point from which the ray emerges. After having traversed the superficial layers of the birefringent material, the emergent rays, corresponding to the initially straight flat beam or pencil, form a prismatic bundle which illuminates the whole field of the compensator.

Then the phase difference corresponding to each of the emergent rays are comprised between two extreme values corresponding to the limits of the field of the compensator and it has been found that such distribution is linear so that the observed fringes remain straight although they are inclined to their original direction. The tangent of the angle between the actual direction of an observed fringe and its original direction is proportional to the birefringence of the surface layer of the transparent material being examined, and thus is proportional to the superficial strain in such material.

In order to measure the angle through which a fringe has turned, there is employed a reference device such as hair or wire which is turned from the original direction of the fringe to its actual observed direction; there is no necessity to give relative displacements to the prisms of the compensator.

The above described measurement of the angle of rotation of the fringes may be best when the fringes pattern and the reference line of the reticule are in the same plane. This result can be obtained by using a special fringe compensator made in accordance with the present invention. Such compensator is made so that the plane of location of the fringes is shifted, and located in the plane of the reticule outside the birefringent plates making up the compensator.

In making such a compensator there are employed two birefringent uniaxial thin plates. One of such plates has parallel faces, the faces having been cut in such manner as to make a definite angle with the optical axis. The other plate is in the form of a small-angled prism, the prism being cut in such manner that its optical axis is parallel to the refringent edge. The prismatic plate is coupled to the parallel faced plate in such manner that their optical axes are at right angle to each other. It has been found that with such compensator the plane of localization of the fringes is not only outside the plates but that it lies very accurately parallel to the external face of the prismatic plate. These features make the compensator especially advantageous, by conveniently choosing the angle between optical axes and plate, one can adjust the plane of localization of the fringes in the plane of the reticule.

The apparatus of the invention is made up essentially of a source of polarized light forming a flat pencil of light. The apparatus includes an optical piece such as a prism having contact with the transparent material being studied, the optical piece permitting the beam of light to penetrate the transparent material at an angle of refraction in the neighborhood of 90° to the normal. The optical piece receives the emergent light beam and directs it into a measuring device including a compensator and analyzer whereby such emergent beam may be analyzed. Such compensator is of the type described above, and permits the measurement of the inclination of the observed fringes. The apparatus includes means which permits the elimination of parasitic rays, and eventually a means for adjusting the dimensions of the pencil of incident light so that the intensity of light received at the analyzing and measuring means will be sufficient for the purposes of observation and measurement.

Turning now to the drawing, there is shown in FIG. 1 a light source in the form of a lamp 1 having a straight filament 6 disposed in a line normal to the plane of the figure. Lamp 1 is mounted with its base in a conventional tubular support 2, the outer surface of support 2 being provided with an externally threaded sleeve 3 fast thereto, such threaded sleeve being threadedly engaged with a threaded ring 4 enabling the axial movement of the lamp. Support 2 is prevented from rotation about its axis as by a suitable spline connection (not shown) between it and the housing of the apparatus. The body 18 of the apparatus, from which the lamp housing rises, is provided with an adjustable optical slit 5 disposed parallel to and vertically aligned with the filament 6. The slit 5 is made up of two confronting plate members 7 and 7' mounted in housing 18. Plate member 7' is fixedly mounted in housing 18; plate member 7 is mounted for adjustment toward and away from member 7' by a screw having a knurled head 8 as shown. The described lamp and optical slit produces a light beam in the form of a flat pencil of rectangular section, the length of this rectangular section being very great with respect to its width. In this way, the direction of such beam of light is determined with respect to the transparent material such as a sheet or plate of glass 14 which is being examined by the respective positions of the light source and the slit. Below the slit 5 in fixed element or body 18 of the apparatus there is positioned a polarizer 9 which may be made, for example, of a sheet of transparent polarizing plastic.

Polarizer 9 is so disposed as to impose to the beam of light a direction of vibration inclined to the median plane of the light beam at an angle, for example, of 45°.

Fixedly positioned within frame member or body 18 of the apparatus and with one edge portion protruding beyond the polarizer 9 is an optical piece or prism 11.

The flat pencil of polarized light 10, indicated in full lines, reaches then the optical piece 11; the optical piece 11 acts for the incident light as a prism with total reflection and sends by its face 12 the rays of the polarized light pencil on the face 13 of the plate 14 to be examined under an incidence very close to the limit incidence corresponding to the system prism-plate, so the refracted rays form in the material of the plate a refraction angle in the neighborhood of 90°. The optical piece 11, is a single piece or formed of assembled pieces and is provided with a lower flat surface 15 which is adapted to rest firmly and accurately upon the upper surface 13 of the specimen 14 being examined. The optical piece 11 is made of transparent material having an index of refraction greater than the index of refraction of the specimen 14 being studied. When the examination of specimen 14 is to take place under polychromatic light, the light dispersing effects of optical piece 11 must be taken into account. In order to obtain an angle of refraction having the same value for the various wave lengths of light, it is desirable to determine the proper dispersion of the optical piece 11 in function to that of specimen 14.

If, for example, the specimen 14 should be glass having an index of refraction of 1.52, the optical piece 11 could have an index of refraction of 1.6. As shown, optical piece 11 has an angularly disposed face 12 at its right hand end (FIG. 1), face 12 being so disposed that the polarized beam of light 10 incident thereon is totally reflected so that it impinges upon the bottom surface 15 of the prism and enters specimen 14 through its upper surface 13 at an angle which approaches 90° with respect to the normal to surface 13 at the zone where the light beam enters it. The inclination of the beam of light upon the surface 15 of prism 11 in contact with specimen 14 is largely greater than the critical angle of the prism with respect to air. To allow nevertheless the beam of light leaving the prism 11 to penetrate the superficial layers of the specimen 14 with an angle of refraction near 90°, it is necessary to interpose between the face 15 of the prism 11 and the flat face 13 of the plate 14 a liquid having an index of refraction greater than the index of refraction of the plate or specimen 14. Such liquid may be, for example, tricresylphosphate, which has an index of refraction of 1.56, when prism 11 and specimen 14 have indexes of refraction of 1.6 and 1.52, respectively.

In order to eliminate parasitic rays which might have a high intensity compared to that of the transmitted light, the apparatus shown includes a mask in the form of an opaque screen to capture or stop such parasite light. The mask may be a reflection surface. In the apparatus shown, for example, a barrier 16 is disposed perpendicularly to the face 15 of prism 11. The barrier is in the form of a groove on the bottom of the prism, such groove being filled with a light absorbent material such as pitch or tar. After having passed along the surface through the superficial layers of the specimen 14, the light rays pass again into prism 11 through the face 15' of the latter. Such light rays, which, as shown, emerge from surface 13 of specimen 14 throughout a marked zone of the surface 13 are totally reflected at a face 17 of the prism disposed at the left hand end thereof. The thus reflected light passes as a bundle of rays 37 upwardly generally axially within a tube 18' of a light-receiving, observing, and analyzing device. The receiving tube 18' contains a compensator 19, the main elements of which are more particularly shown in FIG. 2.

As there shown, the lower compensator plate 20 has parallel upper and lower surfaces and was cut from a birefringent material having a single optical axis 21 such that axis 21 is inclined at an angle of 9° with respect to the parallel faces of plate 20, as shown. An illustrative plate 20 has a thickness of 1.9 mm. Plate 20 is associated with a second prismatic plate 22 made of the same material as prism 20 but so cut that its optical axis 23 lies at right angles to the axis 21 and is parallel to the refringent edge of prismatic plate 22. The upper face 24 of prism 22 is inclined at an angle of 2°30' with respect to its lower face which is adhesively secured to the upper face of prism 20. The left hand edge of prism 22 (FIG. 2) has a thickness of 2.25 mm. In such an assembly the compensator formed has a plane P of localization of the fringes F parallel to the upper surface 24 of prism 22 and spaced therefrom a distance of 9 mm. It is to be understood that the values above given relating to one embodiment of compensator are illustrative only and not limiting.

The two plates 20 and 22 of the compensator are mounted in a support 19a, FIG. 1, which is positioned in a plane perpendicular to the bundle of received rays 37 so that the refringent edge of the prism is in the emergence plane. As shown in FIG. 2, the rays 37 impinge upon the lower surface of birefringent plate 20 and are divided into two rays 38 and 41. Ray 38 travels vertically within both plates 20 and 22. Ray 41 travels vertically angularly but when it reaches plate 22 travels vertically in a path somewhat displaced from ray 38. Upon reaching the upper inclined surface 24 of plate 22 the two rays 40 and 43 converge to form an interference fringe F upon the plane P. The support 19a may be made adjustable in its plane by conventional means not shown such that one may observe the fringes which are obtained over an extended range even with a source of polychromatic light.

After having passed through the compensator, the bundle of rays 37 reaches an analyzer 26. Within tube 18' there is mounted a tube 30 provided with a graduated ring 31. Tube 30 carries a positive type ocular 27 and a reticule 29 which may be made by a sheet of glass which has been suitably etched. The ocular 27 may be adjusted longitudinally of the tube 18' to permit the operator to view the reticule most clearly. The reticule 29 is fixed to tube 18' and is positioned to coincide with the plane P of localization of the fringes of the compensator. The reticule is rotated when the graduated ring 31 is rotated so that the reference mark or hair of the reticule may be placed in coincidence with the observed fringes. The coincidence is observed by ocular. Since the ring 31 is suitably calibrated, after the reticule has been made to coincide with the fringe their angle may readily be read by reading the angle of turning of ring 31. If desired, the graduations marked upon ring 31 may be the tangents of the observed angle, thereby allowing the value of the superficial strain component normal to the incidence plane in the specimen 14 to be read directly.

The apparatus of the invention is provided with a particularly advantageous device allowing the choice of the point to be observed on the specimen, such point having previously been marked on the surface of the specimen and that by observing a mark on said surface. As shown in FIGS. 1 and 3, the apparatus is provided with an adjustable member 33 which is slidably mounted transversely of tube 18', member 33 comprises two aligned openings extending through opposite sidewalls thereof. Slide 33 carries in one opening an objective lens 32 and in another position a hole 32'. Slide 33 may selectively be placed so that either the objective 32 or the hole 32' is aligned with the axis of tube 18'. When the apparatus is employed as above described in receiving and analyzing light rays 37, the slide 33 is positioned as shown in FIG. 3. When, however, the aparatus is being initially set up to position it in the desired spot on specimen 14, the slide 33 is positioned to align hole 32' therein with the axis of tube 18'. This allows the marked spot to be directly observed through the ocular 27. After the apparatus has been correctly positioned, objective 32 is restored to operative position by sliding member 33.

In the apparatus shown, all of the elements are positioned in an enclosure which includes a protective hood 34 for the lamp and a skirt 35 which surrounds the prism 11 without contact with the surface of the specimen. The optical slit 5 and the polarizer 9 are fixed on body or element 18. The optical piece 11 and the skirt 35 are secured one to another by means, for example, of two keys not shown, introduced into openings provided on their wall. On the above described frame 35 is placed tube 18' provided with slits into which may be slid the adjustable member 33 and the objective.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In an instrument for detecting and measuring surface strains in a glass specimen having a plane surface, a glass prism having a plane face adapted to rest on the plane surface of the specimen in contact therewith, a light barrier in said prism, lying in a plane normal to said face and intersecting the same in a first line, means for projecting a plane beam of light through said prism and onto said face to intersect the same in a second line closely adjacent said first line and at a dihedral angle not less than the critical angle of incidence of said prism, and optical means for observing light from said projecting means refracted into said prism on the other side of said barrier, after traversing surface layers of the specimen.

2. The instrument of claim 1, said angle of incidence approaching 90° with the normal to said plane face, said optical means including an analyzer.

3. In an instrument for measuring surface strains in glass specimen having a plane surface, a glass prism having an index of refraction slightly greater than that of the sheet to be tested, and a plane face adapted to rest on the plane surface of the sheet in surface contact therewith, a source of plane polarized light, means projecting a planar beam of light from said source through said prism and onto and along a line in said face, said projected beam making a dihedral angle closely approaching 90° with respect to the normal to said face, light-barrier means in said prism along said line to intercept light from said source reflected by said face, and ocular means including an analyzer, for observing light from said projecting means refracted into said prism on the other side of said barrier, after traversing surface layers of the specimen.

4. The instrument of claim 3, said ocular means also including a compensator in optical alignment with and in advance of said analyzer.

5. In an instrument for detecting and measuring strains in the plane surface of a glass specimen, a glass prism having an index of refraction slightly greater than the corresponding index of the specimen and a plane face adapted to rest upon the plane surface of the specimen in contact therewith, and a plane opaque light barrier in said prism normal to the plane face thereof and intersecting said face in a line.

6. The instrument of claim 5, said barrier comprising a planar slot in said prism, a light impervious material filling said slot, means for projecting a plane beam of polarized light through said prism onto the plane face thereof at an angle not less than the critical angle of incidence of the glass of which said prism is formed.

7. The instrument of claim 6, in combination, and a thin layer of liquid between the surface of the specimen and the plane face of said prism, said liquid having an index of refraction slightly greater than the corresponding index of the specimen.

8. The instrument of claim 7, said liquid being tricresylphosphate.

9. In an apparatus for testing for, and measuring, birefringence in the surface of a plane sheet of glass, a frame, a glass prism mounted in said frame and having first, second and third plane faces, said first and third faces intersecting said second face at obtuse angles in first and second spaced, parallel lines forming boundaries of said second face, said second face being adapted to rest upon the sheet to be tested in surface contact therewith, a source of polarized light, means carried by said frame to project a narrow rectangular beam from said source onto said first face in parallelism with said lines, for total reflection onto said second face along a third line therein and at an angle approaching 90° with the normal to said second face, light-impervious barrier means in said prism normal to and opening through said second face along said third line, and optical ocular means carried by said frame and including an analyzer for observing rays from said source reflected by said third face.

10. In an apparatus for detecting and measuring surface strains in a plane sheet of glass, a frame, a prism mounted in said frame and having an index of refraction slightly greater than the corresponding index of the sheet to be tested, said prism having first, second, and third plane faces, said first and third faces intersecting said second face at obtuse angles in respective first and second spaced parallel lines forming boundaries of said second face, said second face being adapted to rest upon and in surface contact with the sheet to be tested, opaque planar barrier means in said prism intersecting said second face normal thereto, in a third line between and parallel to said first and second lines, a light source, means carried by said frame to project a planar beam of polarized light from said source, onto said first face in parallelism with said lines, said first face totally reflecting said beam onto said second face, contiguous to said third line and at a dihedral angle not less than the critical angle of incidence of said prism, and optical means carried by said frame and including an analyzer, for observing light from said source refracted by and through surface layers of the sheet to the other side of said barrier means and totally reflected by and from said third face.

11. The apparatus of claim 10, said last named means also including a part mounted for movement in a plane normal to the direction of light rays reflected from said third face, and carrying an objective and an aperture, said slide being movable to selectively position said aperture or said objective in the path of said rays.

12. The method of testing a sheet of glass for strains in the surface layers thereof, comprising, positioning on the sheet in surface contact therewith the planar face of a glass prism having a planar opaque light barrier extending from said face normal thereto, projecting a planar beam of polarized light through said prism onto said face at an angle of incidence closely approaching 90° to intersect said face in a line closely adjacent said barrier, and passing light from said beam refracted through surface layers of said sheet into said prism on the other side of said barrier, to a compensator and an analyzer in sequence.

13. The method of examining the superficial layers of a transparent specimen to effect determination of the properties thereof, such as birefringences and thus surface strains in the specimen, comprising, generating a beam of incidence light, directing at least a part of said beam through a transparent medium in surface contact with and forming an interface with the specimen and having an index of refraction greater than the index of refraction of said specimen, and onto a first zone of the interface between the medium and specimen, so that at least a part of the incident light strikes said interface zone at an angle of refraction near 90°, and some light energy propagates in the surface layers of the specimen, along said interface and returns into the medium at a second zone of said interface, spaced from said first zone, obstructing direct passage of light through said medium between said zones, and observing the beam of incident light refracted from said second zone, through said medium.

14. The method of claim 13, said beam of incident light having the form of a thin flat pencil of rays, directing the beam emergent from said second zone to a fringe compensator having an interface substantially perpendicular to the emergent beam, the natural direction of the fringes being parallel to a plane defined by an emergent ray and the normal to the surface of the specimen at said second zone to thereby produce rectilinear fringes which are angularly displaced from their natural directions, and measuring said angular displacement as a function of the birefringence of the specimen, to obtain a value proportional to surface strains in the specimen traversed by said beam.

15. The instrument of claim 4, said compensator comprising two plates which are birefringent about a single axis, one of the plates having parallel faces cut so that they make a predetermined desired angle with the optic axis, the other plate being prismatic, of small angle, and cut in such manner that its optic axis is parallel to its refringent edge, the two plates being coupled in such manner that their optic axes are at right angles to each other.

16. Apparatus as claimed in claim 15, and means mounting said two plates of the compensator perpendicularly to the beam reflected from said third face and for adjustment in the direction perpendicular to said beam.

References Cited by the Examiner

UNITED STATES PATENTS

| | | | |
|---|---|---|---|
| 1,756,785 | 4/1930 | Gallasch | 88—14 |
| 1,875,665 | 9/1932 | Schweizer. | |
| 1,883,971 | 10/1932 | Kryzanowsky | 88—1 |
| 1,926,716 | 9/1933 | Ehringhaus | 88—65 |
| 1,978,434 | 10/1934 | Maris | 88—14 |
| 2,215,211 | 9/1940 | Devol | 88—14 |
| 2,239,263 | 4/1941 | Waine et al. | 88—14 |
| 2,625,850 | 1/1953 | Stanton | 88—14 |
| 2,700,918 | 2/1955 | Osterberg et al. | 88—65 X |
| 2,995,060 | 8/1961 | Acloque | 88—65 |
| 3,034,395 | 5/1962 | Zandman | 88—14 |
| 3,039,349 | 6/1962 | Rodgers. | |

FOREIGN PATENTS

| | | |
|---|---|---|
| 1,116,824 | 2/1956 | France. |
| Ad. 70,037 | 10/1958 | France. |
| | | (1st Add. to 1,116,824) |
| Ad. 71,278 | 4/1959 | France. |
| | | (1st Add. to 1,148,457) |
| 489,392 | 8/1928 | Germany. |
| 874,392 | 8/1961 | Great Britain. |
| | | (Corresponds to Add. 70,037) |

OTHER REFERENCES

Rothen: The Ellipsometer an Apparatus to Measure Thicknesses of Thin Surface Films, The Review of Scientific Instruments, vol. 16, No. 2, February 1945, pp. 26–30.

JEWELL H. PEDERSEN, *Primary Examiner.*

E. G. ANDERSON, *Examiner.*

T. L. HUDSON, O. B. CHEW II, *Assistant Examiners.*